(12) United States Patent
Matsui

(10) Patent No.: US 6,980,253 B1
(45) Date of Patent: Dec. 27, 2005

(54) PROMPTER

(75) Inventor: Nobuo Matsui, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 823 days.

(21) Appl. No.: 09/671,449

(22) Filed: Sep. 27, 2000

(30) Foreign Application Priority Data

| Sep. 28, 1999 | (JP) | ................................ 11-274634 |
| Sep. 28, 1999 | (JP) | ................................ 11-274635 |
| Sep. 28, 1999 | (JP) | ................................ 11-275017 |
| Sep. 28, 1999 | (JP) | ................................ 11-275018 |
| Sep. 28, 1999 | (JP) | ................................ 11-275019 |

(51) Int. Cl.[7] ........................ H04N 5/225; G03B 31/00
(52) U.S. Cl. ........................... 348/375; 348/722; 352/4
(58) Field of Search ................ 348/373, 375, 348/722; 352/4; 248/424, 419

(56) References Cited

U.S. PATENT DOCUMENTS

| 2,711,667 | A | * | 6/1955 | Simjian ........................ 352/4 |
| 2,796,814 | A | * | 6/1957 | Cuneo et al. ............. 248/274.1 |
| 2,926,559 | A | * | 3/1960 | Oppenheimer ................. 352/4 |
| 3,824,339 | A | * | 7/1974 | Eisenberg ................... 348/722 |
| 4,894,722 | A |   | 1/1990 | Suzuki |
| 5,386,227 | A | * | 1/1995 | Zeper .......................... 348/61 |
| 5,721,586 | A |   | 2/1998 | Shimamura et al. |
| 5,790,194 | A |   | 8/1998 | Shimamura |

| 6,717,619 | B2 | * | 4/2004 | Wasada .................. 348/375 |
| 2002/0008774 | A1 | * | 1/2002 | Yata et al. .............. 348/375 |
| 2002/0030758 | A1 | * | 3/2002 | Wasada .................. 348/375 |

FOREIGN PATENT DOCUMENTS

| JP | 1-147970 | | 6/1989 | |
| JP | 05014777 | A * | 1/1993 | .......... H04N 5/222 |
| JP | 5-130461 | | 5/1993 | |
| JP | 05130461 | A * | 5/1993 | .......... H04N 5/222 |
| JP | 11-101931 | | 4/1999 | |
| JP | 11101931 | A * | 4/1999 | ............ G02B 7/02 |

OTHER PUBLICATIONS

Taijiro Seo et al., "A Portable Prompter System Equipped with a Liquid Crystal Display", Mar. 1990, pp. 200-202, SMPTE Journal.
Examiner: J. Wentzel, European Search Report, Completion Date: Dec. 19, 2000, 5 pages, Place of Search: The Hague.

* cited by examiner

*Primary Examiner*—Thai Tran
*Assistant Examiner*—John M. Villecco
(74) *Attorney, Agent, or Firm*—Birch, Stewart, Kolasch & Birch, LLP

(57) ABSTRACT

A support stage for a prompter has a bi-divisional structure comprising a first support stage on which an LCD and a semitransparent mirror are supported and a second support stage on which an ENG camera is supported. Because the first support stage and the second support stage are constructed in the manner as to be capable of overlapping with each other by a slide mechanism, the support stage can be compact in size and can have a better weight balance; hence the support stage is easy to carry.

2 Claims, 15 Drawing Sheets

PROMPTER

BACKGROUND OF THE INVENTION

1. Field of the Invention

The present invention relates to a prompter, which displays an image of a script so that it is visible to the newscaster on a television program.

2. Description of Related Art

A prompter disclosed in Japanese Patent Application Laid-open No. 1-147970 comprises a transparent liquid crystal display panel (hereunder named as "an LCD panel") and a semitransparent mirror, which reflects an image of a script displayed on the LCD panel toward a newscaster. The LCD panel and the semitransparent mirror are fixed on a support stage (support member), which is detachably attached to a camera platform of a tripod. A TV camera is also detachably attached on the support stage behind the semitransparent mirror. The newscaster can thereby read the script, of which image is reflected on the semitransparent mirror, while looking toward the TV camera through the semitransparent mirror.

Considering its portability, an ENG camera, which can be carried on a cameraperson's shoulder, is applied to a prompter system for an outdoor reporting since a reporter often has to quickly shift reporting locations many times.

With this type of prompter system, in the case of changing a reporting location, the support stage is detached from the camera platform after detaching the ENG camera from the support stage, and thus the prompter system is divided into three parts that are the ENG camera part, a part comprising the LCD panel, a semitransparent mirror and a support stage, and a tripod part; then the three parts are carried to the next reporting location.

The above-mentioned conventional prompter system can be easily carried with its ENG camera and the tripod, but not with its support stage at which the LCD panel and the semitransparent mirror are supported. This is because the entire support stage is a long object which comprises a front member for supporting the LCD panel and the semitransparent mirror and a rear member for supporting the ENG camera; and further, the weight of the front part of the support state is considerably heavier than the rear part and thus the weight balance of the support stage is poor.

In another prompter disclosed in Japanese Patent Application Laid-open No. 5-130461, an LCD panel is provided at a bottom lid of a case which can be opened and closed, and a semitransparent mirror is provided to the upper lid of the case, and the prompter has a hinge which can engage with the semitransparent mirror at the angle of 45 degrees with respect to the LCD panel when opening the upper lid. In the prompter, the semitransparent mirror can be automatically set at the position of the 45 degrees, where the semitransparent mirror is used, by only opening the upper lid from a housing position which is the position of the upper lid at the closing state.

This prompter, however, does not have a mechanism to regulate vertical positions of the semitransparent mirror with respect to the LCD panel. Because of that, the vertical positions of the semitransparent mirror must be adjusted at every time when positioning the semitransparent mirror from the housing position to the using position; thus this prompter has a difficulty with position adjustment.

This type of prompter encloses an optical path of the image of the script which is formed between the LCD panel and the semitransparent mirror with a masking cover (a masking member) in an attempt to clearly show to the newscaster the image of the script reflected by the semitransparent mirror.

The masking cover is formed with a member such as flexible nylon and the like, and comprises a top face which is arranged at the upper part of the semitransparent mirror, a side face which is arranged at the lateral side of the semitransparent mirror, and a back face which is arranged at the rear of the semitransparent mirror. When the semitransparent mirror is folded from the using position to the housing position at carrying the prompter, the masking cover is folded by following the folding action of the semitransparent mirror so as to cover the semitransparent mirror.

The conventional masking cover for the prompter can absorb shock to some extent by its self-elasticity when bumping against an obstacle while the prompter is being carried; however, this masking cover is basically not constructed to protect the semitransparent mirror from the shock. Thus, the masking cover cannot sufficiently protect the semitransparent mirror from the shock.

Because of the characteristics of the transparent LCD panel, the displayed image of the script is difficult to see when the external light enters into the LCD panel. Hence, a thin plate masking member named a masking flag is extended from the masking cover to further forward so as to prevent the external light from entering into the LCD panel.

The conventional masking flag for the prompter, however, is not made for portability despite its large size compared with the masking cover; thus, the masking flag is too bulky to carry.

A lens of the TV camera is inserted from a lens insertion hole of a member with a lens insertion hole arranged at the rear of the semitransparent mirror, and is positioned at a predetermined position at the rear of the semitransparent mirror. After the positioning operation, the TV camera is thus fixed at the support stage.

The conventional prompter has a disadvantage in that when the TV camera lens is inserted from the lens insertion hole of the member with the lens insertion hole while positioning the TV camera lens, the top end of the TV camera may collide with the semitransparent mirror by mistake, and the semitransparent mirror may be damaged.

SUMMARY OF THE INVENTION

The present invention has been developed in view of the above-described circumstances, and has as its object the provision of a prompter support member which is easy to carry.

Moreover, the present invention provides a semitransparent mirror support structure for the prompter which eliminates the difficulty of position adjustment for positioning the semitransparent mirror at the using position.

The present invention also provides a masking member for the prompter which can sufficiently protect the semitransparent mirror from shock.

Further, the present invention provides a masking member for the prompter which is easy to carry.

Furthermore, the present invention provides a prompter which prevents the TV camera from colliding with the semitransparent mirror and also protects the semitransparent mirror from the TV camera.

In order to achieve the above-described objects, the present invention is directed to a prompter support member which supports a prompter system at a camera platform, the prompter system comprising a display which displays an image, a semitransparent mirror which reflects the image displayed on the display in a predetermined direction, and a TV camera arranged at a rear of an image reflecting face of the semitransparent mirror, wherein: the prompter support member has a multi-divisional structure comprising a plurality of support members, and the divided plurality of support members are able to be overlapped by an overlapping mechanism.

According to the present invention, the divided plurality of support members can be overlapped by the overlapping mechanism, hence the plurality of support members are overlapped and carried. The support member can be compact in size, and the weight balance is improved; so that it is easy to carry.

Preferably, a slide mechanism for slidably connecting the plurality of support members is applied as the overlapping mechanism. By this slide mechanism, the plurality of support members can be easily overlapped only by sliding the plurality of support members relatively closer to each other.

Preferably, the plurality of support members are constructed in the bi-divisional structure which comprises the first support member and the second support member, and the display and the semitransparent mirror are supported at the first support member whereas the TV camera is supported at the second support member. When carrying the support members, the TV camera is detached from the second support member and the second support member is overlapped on the first support member. Thereby the support members can be compact in size, and its weight balance is improved, hence is easy to carry.

The present invention is also directed to a semitransparent mirror support structure for a prompter with a semitransparent mirror for reflecting an image displayed on a display in a predetermined direction, wherein: a regulating member for regulating a position of the semitransparent mirror in a moving direction is provided to a support member for supporting the semitransparent mirror and for adjusting the position of the semitransparent mirror at a predetermined inclination angle and in the predetermined moving direction with respect to the display.

According to the present invention, the regulating member for regulating the position of the semitransparent mirror in the moving direction is provided at the support member which movably supports the semitransparent mirror in the moving direction with respect to the display. Thus, when moving the semitransparent mirror from the housing position to the using position, the position of the semitransparent mirror in the moving direction is automatically set by the regulating member. The present invention therefore eliminates the difficulty of the position adjustment of the semitransparent mirror.

Preferably, the support member is constructed by the holding member for holding the semitransparent mirror and the guide member for movably guiding the semitransparent mirror in the moving direction via the holding member. The stopper member is applied to the support member as the regulating member. When moving the semitransparent mirror from the housing position to the using position, the holding member contacts with the stopper member and the position of the semitransparent mirror is regulated in the moving direction. Thus, the position of the semitransparent mirror in the moving direction is automatically set.

The present invention is also directed to a masking member for a prompter which is provided to the prompter for reflecting an image displayed on a display to front with a semitransparent mirror and which encloses an optical path of an image formed between the display and the semitransparent mirror, wherein: the masking member comprises a top face with a reinforcing plate which is arranged at the top of the semitransparent mirror and a back face with a reinforcing plate which is arranged at the rear of the semitransparent mirror; and the masking member is able to be folded in which the back face overlaps with the top face whereby the semitransparent mirror is protected by the reinforcing plates of the top face and the back face.

According to the present invention, the masking member is constructed so that it can be folded by overlapping the back face on the top face of the masking member. When the back face overlaps with the top face, the respective reinforcing plates of the top face and the back face are positioned at the upper part of the top face of the semitransparent mirror. The semitransparent mirror can thus be sufficiently protected from shock with these reinforcing plates. In other words, the masking member of the present invention is provided with reinforcing plates on the back and the top faces, and protects the semitransparent mirror with the reinforcing plates by overlapping the back face with the top face when folding the masking member. Material of the reinforcing plate is preferable to use metal such as aluminum or plastic in view of securing strength.

The present invention is also directed to a masking member for a prompter which is provided at the prompter for reflecting an image displayed on a display in a predetermined direction with a semitransparent mirror and which prevents an external light from entering in the display, wherein: the masking member is constructed in a divisional structure including at least two members; and the divided members which can be folded are connected with a flexible tape member.

According to the present invention, the masking member is constructed in a divisional structure comprising at least two members, and the divided members which can be folded are connected with the flexible tape member. When carrying the masking member, the divided members are folded so as to be compact in size. Thus, the masking member is easy to carry.

The present invention is also directed to a prompter, comprising: a display which displays an image; a semitransparent mirror which reflects the image displayed on the display to front; a lens insertion hole providing member which is arranged at rear of the semitransparent mirror, a lens insertion hole being formed in the lens insertion hole providing member, a TV camera lens being inserted in the lens insertion hole so as to be arranged at a predetermined position; and a regulating member which is arranged inside of the lens insertion hole of the lens insertion hole providing member and at rear position of the semitransparent mirror, the regulating member regulating an insertion position of the TV camera lens.

According to the present invention, when inserting the TV camera from the lens insertion hole of the member with the lens insertion hole to the predetermined position at the rear of the semitransparent mirror, the top end of the TV camera lens contacts with the regulating member which is arranged at the predetermined position, and the insertion of the TV camera lens later on is regulated. The present invention can prevent the TV camera lens from colliding with the semitransparent mirror, and therefore can protect the TV camera lens from the semitransparent mirror.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Hereunder preferred embodiments of a prompter of the present invention will be described in detail in accordance with the accompanying drawings.

Figure 1:
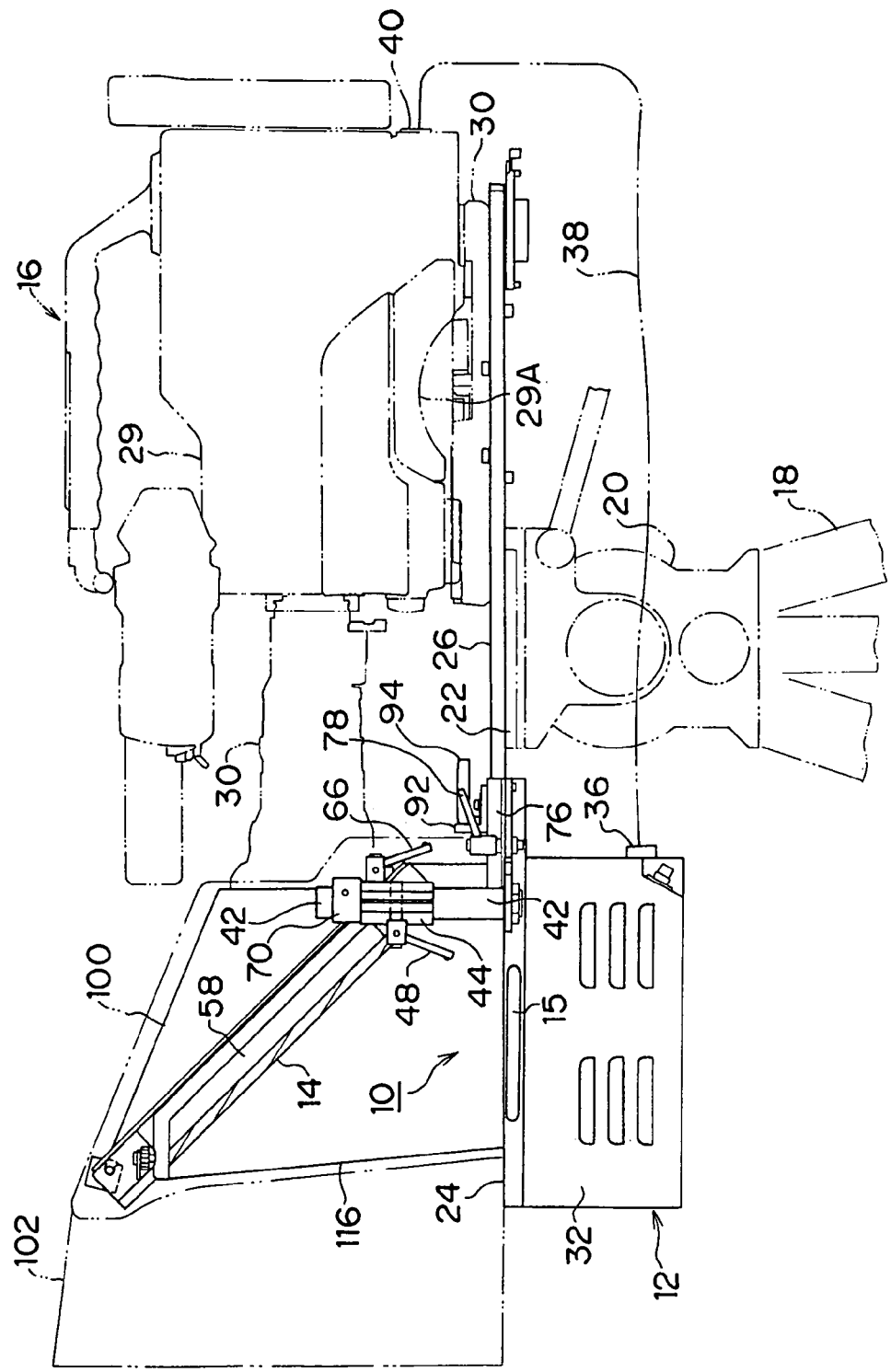
FIG. 1 is a front view showing an example in which a prompter support stage of am embodiment of the present invention is applied to a prompter system with an ENG camera.

FIG. 1 is a front view of a prompter support stage (support member) 10. As seen from FIG. 1, the support stage 10 is a support member for supporting a prompter system on a camera platform 20 disposed at a tripod 18. The prompter system comprises a prompter, which comprises a liquid crystal display (LCD) device 12 and a semitransparent mirror 14, and an ENG camera 16, which is shown with alternate long and two short dashes lines in FIG. 1. The support stage 10 is detachably attached to the camera platform 20 via an attachment member 22, which is fixed at substantially the center of the bottom face of the support stage 10.

Figure 2:
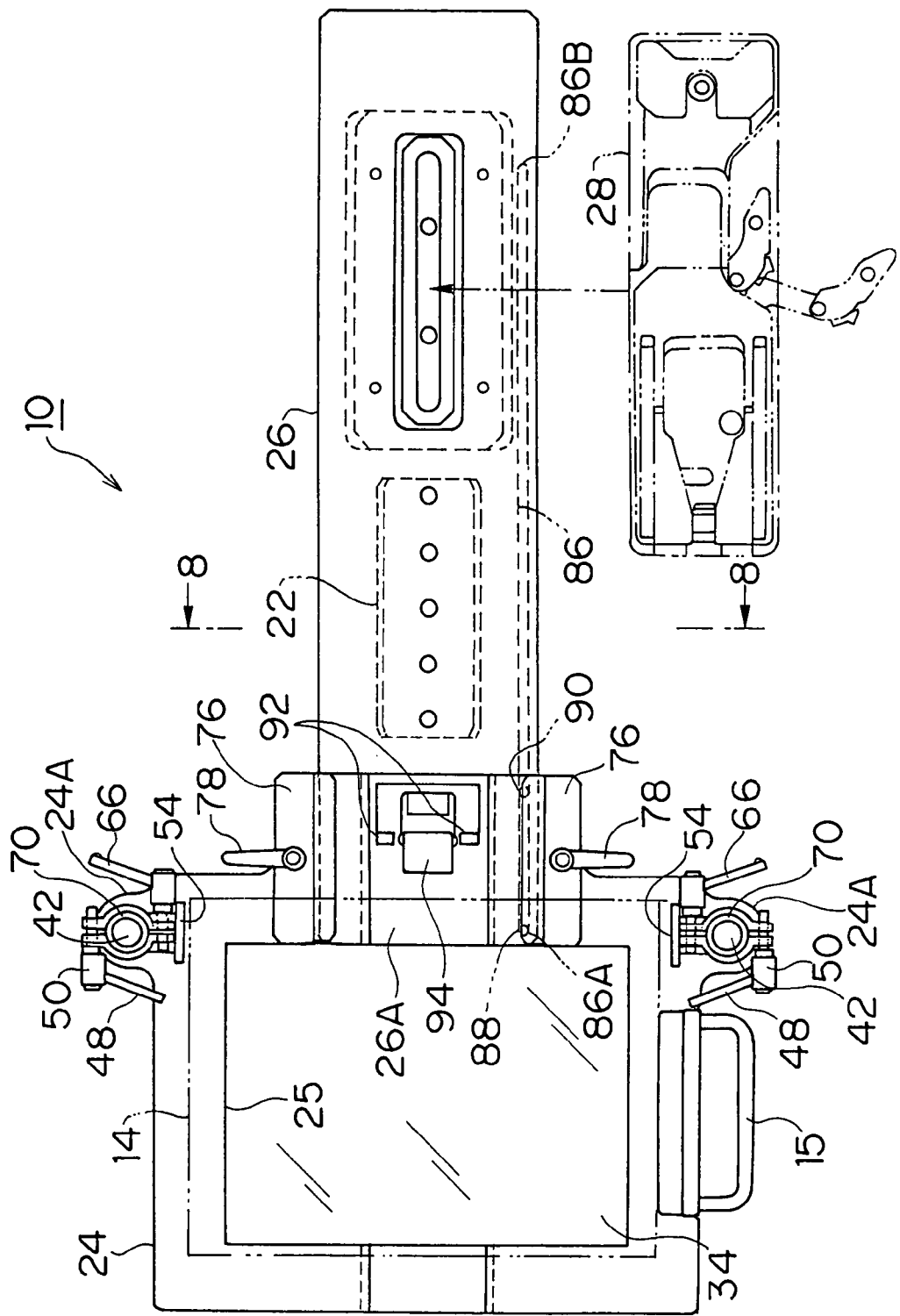
FIG. 2 is a plan view of the prompter support stage in FIG. 1.

The support stage 10 is constructed in a bi-divisional structure comprising a first support stage (first support member) 24 in a shape of a frame as shown in FIG. 2 and a second support stage (second support member) 26 in a rectangular shape. The LCD device 12 and the semitransparent mirror 14 in FIG. 1 are attached to the first support stage 24, and the ENG camera 16 is attached to the second support stage 26. The ENG camera 16 is constructed with a body 29, on which a shoulder rest 29A is formed, and an ENG lens 30. The body 29 is attached at a predetermined position of the second support stage 26 via an adapter member 28. The adapter member 28 has a structure in which a position with respect to the second support stage 26 can be adjusted. By this structure, the position of the body 29 with respect to the second support stage 26 is adjusted, and thus the position in the four directions (front, rear, right, and left) with respect to the semitransparent mirror 14 can be adjusted.

As seen from FIG. 1, the LCD device 12 has a box-shaped body 32, which is fixed at the bottom of the first support stage 24. As seen from FIG. 2, an LCD panel 34 in a rectangular shape is provided at the top face of the body 32, and the LCD panel 34 is attached with its display face directed to the upper part via a rectangular opening 25, which is formed at the first support stage 24.

Moreover, a picture input terminal 36 like the one in FIG. 1 is provided at the side face of the body 32 of the LCD device 12. The picture input terminal 36 is connected with a picture output terminal 40 of the body 29 via a cable 38.

Before a performance, a script is placed at the front of the semitransparent mirror 14, and is imaged by the camera body 29 via the ENG lens 30. Thereby a picture signal presenting the image of the script is inputted to the LCD device 12, and the picture signal is stored by an image processing device, which is built in the LCD device 12. Then, at the performance, the image of the stored script is displayed on the LCD panel 34, and the script image displayed on the LCD panel 34 is reflected to the left side in FIG. 1 by the semitransparent mirror 14, so that a newscaster, who is now the subject of the ENG camera 16, can read the displayed script.

In addition to the picture input terminal 36, the body 32 of the LCD device 12 is also provided with a connector for a power source, a connector for remote-controlled editing, a power switch, and so forth. Upon turning the power source on, the LCD device 12 is activated by the electricity supplied from the power source via the connector for the power source. The image of the script is displayed on the LCD panel 34, and the LCD device 12 is remote controlled by a remote control signal of the remote control operating part, which is outputted via the connector for remote-controlled editing. The content of the remote control operation includes switching of the display image, and the image is switched by the newscaster, who reads the displayed script.

Figure 3:
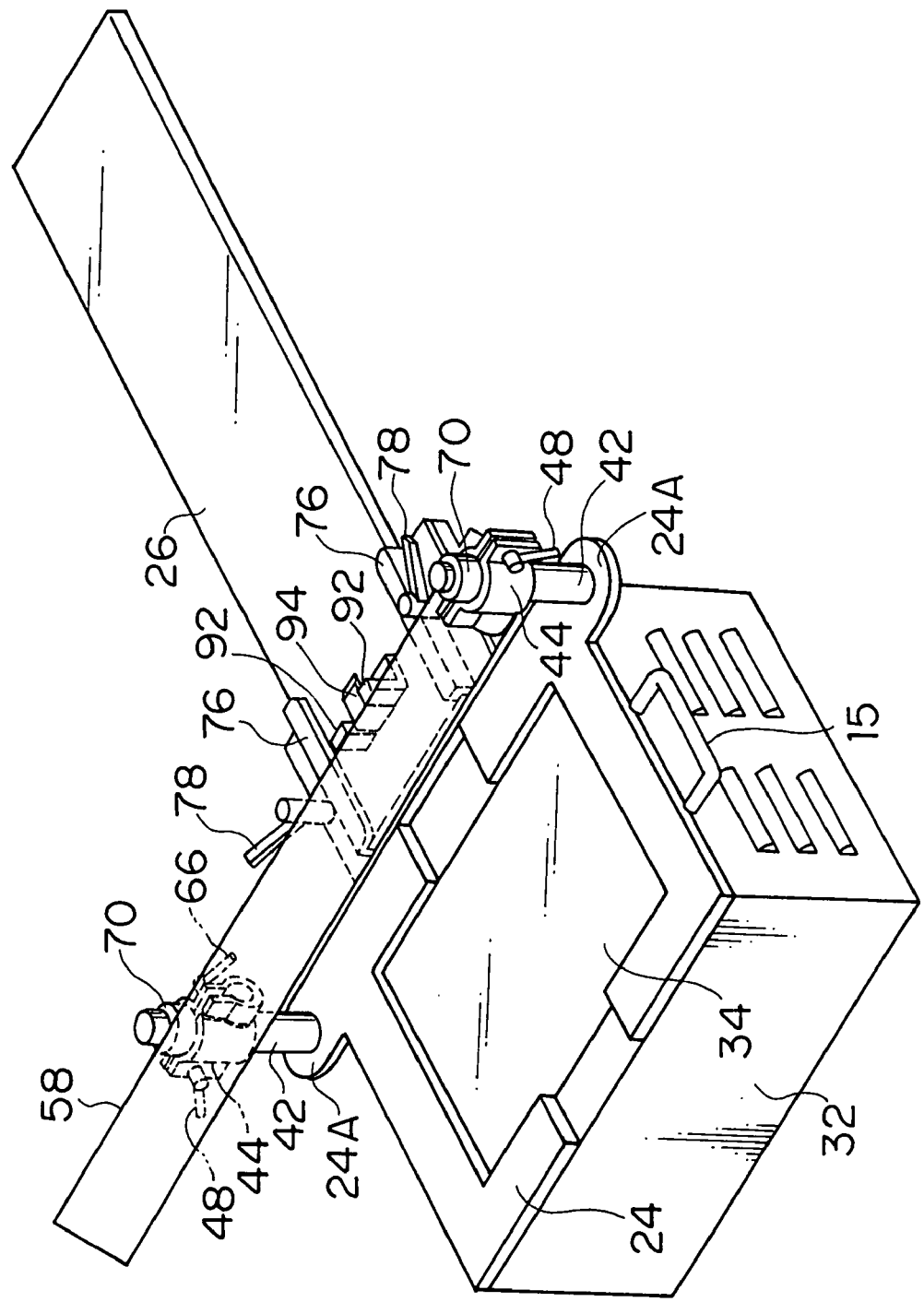
FIG. 3 is a perspective view of the prompter support stage in FIG. 1.

Now, a support structure for the semitransparent mirror of the present embodiment will be described. As seen from FIGS. 1–3, the semitransparent mirror 14 is supported to be vertically movable along a pair of poles (guide member) 42 and 42, which are provided at the first support stage 24. As seen from FIG. 3, the pair of poles 42 and 42 are fixed at tabs 24A and 24A, which are integrally formed with the first support stage 24, and a sleeve (holding member) 44 for moving the semitransparent mirror 14 in vertical directions (i.e. moving the semitransparent mirror 14 with respect to the LCD panel 34) is fitted in the pole 42 to be freely movable in vertical directions. As seen from FIG. 4, a channel 46 is formed in parallel with the axial direction of the sleeve 44, and a screw bar 50 on which a lever 48 is formed and a screw bar 50 on which a lever 48 is formed is screwed into a pair of tabs 47 and 47 which are formed at both sides of the channel 46. Thus, the width of the channel 46 is narrowed as rotating the screw bar 50 with the lever 48 in a fastening direction, and the sleeve 44 is pressed against the pole 42 so as to be fixed at the pole 42.

The sleeve 44 is integrally formed with a sleeve 52 (holding member) with a shorter diameter than that of the sleeve 44. The sleeve 52 is formed in a direction to perpendicularly cross the sleeve 44, and a rod 56 of a bracket 54 in an oval shape is rotatably fitted. The bracket 54 is attached at both side faces of a box-shaped casing 58 to which the semitransparent mirror 14 in FIG. 1 is fixed. By this structure, the semitransparent mirror 14 is rotated with the rod 56 as the center, and is also rotated in a range between the using position in FIG. 1 (inclination angle is 45 degrees) and the housing position in FIGS. 5 and 6 (inclination angle is zero degrees). Moreover, a stopper pin for setting the semitransparent mirror 14 at the using position in FIG. 1 is projected to the bracket 54 in FIG. 4, and a stopper plate 62 with which the stopper pin 60 contacts is projected and formed at the side face of the sleeve 52. The stopper pin 60 moves in a clockwise direction with the rod 56 as the center as shown in FIG. 7 when rotating the semitransparent mirror 14 from the housing position to the using position. Then, when the semitransparent mirror 14 is rotated (inclined) by 45 degrees, the stopper pin 60 contacts with the stopper plate 62, and the rotation later on is regulated. Thereby the semitransparent mirror 14 is automatically set at the using position at 45 degrees.

Figure 4:
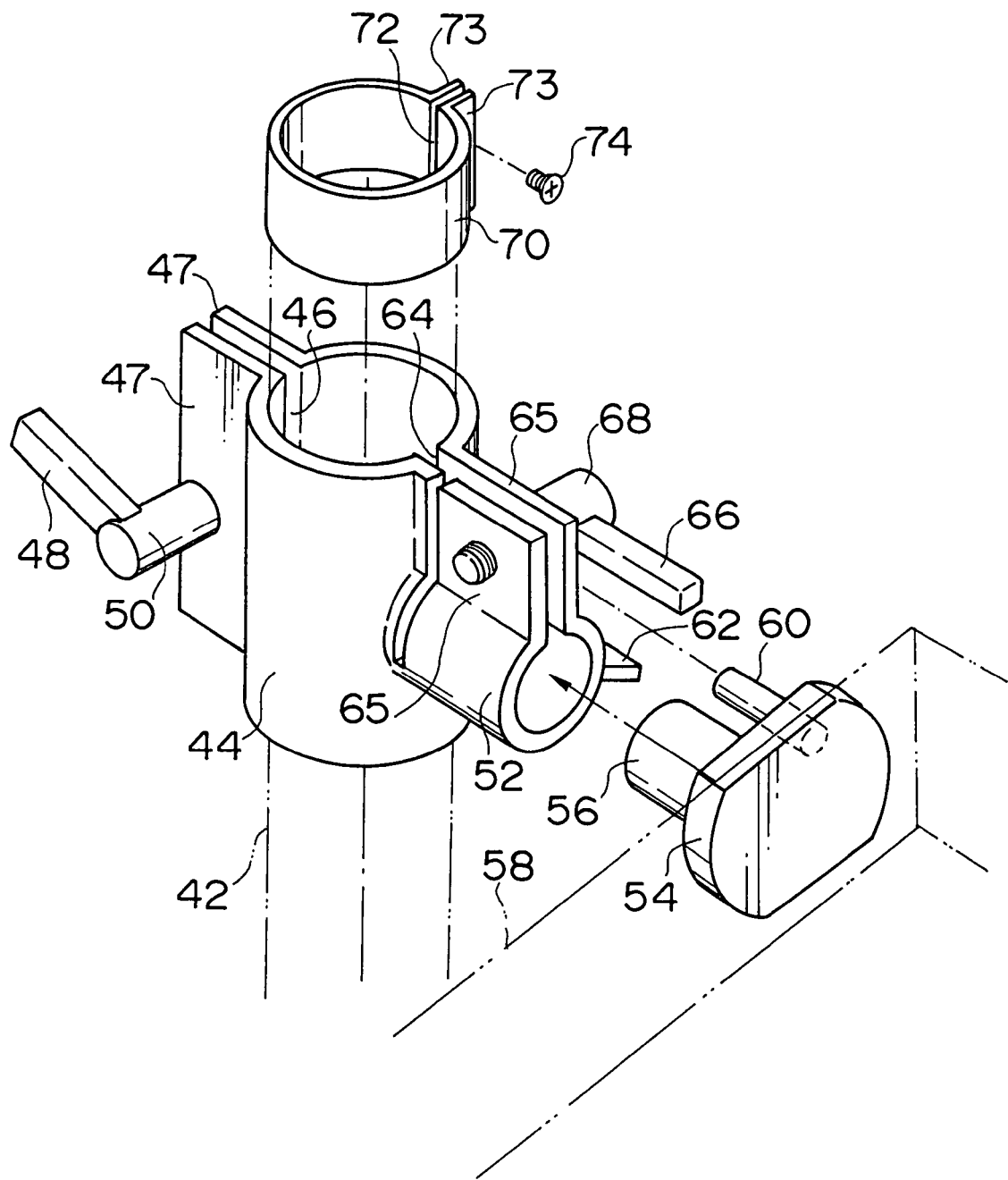
FIG. 4 is an enlarged perspective view of essential parts of a structure for a prompter for adjusting a height of a semitransparent mirror.

Similarly with the sleeve 44, a channel 64 is formed at the sleeve 52 as the one in FIG. 4, and a screw bar 68 to which a lever 66 is formed is screwed into a pair of tabs 65 and 65 that are formed at both sides of the channel 64. The width of the channel 64 is narrowed when rotating the screw bar 68 in a fastening direction with the lever 66; thus the sleeve 52 is pressed and fixed at the rod 56. The semitransparent mirror 14 is fixed at the using position or the folding position by this mechanism.

Viewing the upper part of the pole 42, a stopper ring (a stopper member as a regulating member) 70 is fitted. When the top of the sleeve 44 contacts with the bottom of the stopper ring 70, the height of the sleeve 44, that is, the height of the semitransparent mirror 14 with respect to the LCD panel 34, is determined. The stopper ring 70 has a channel 72 like the sleeves 44 and 52, and a screw 74 is screwed in a pair of tabs 73 and 73 that are formed at both sides of the channel 72. The width of the channel 72 is narrowed when fastening the screw 74; hence the stopper ring 70 is pressed and fixed at the pole 42. The semitransparent mirror 14 is thereby moved up at the height of the using position which is regulated by the stopper ring 70.

The height of the semitransparent mirror 14 is set in accordance with a height of the ENG lens 30 when attaching the ENG camera 16 to the second support stage 26. Because of that, if an identical ENG camera 16 is used, the height is constant. Therefore, when raising the semitransparent mirror 14 at the using position from the folding position, the height is automatically adjusted without an adjustment at every adjustment by fixing the stopper ring 70 to the pole 42 at the height corresponding with the constant height; hence the difficulty with the adjustment of the height of the semitransparent mirror 14 can be eliminated.

Figure 8:
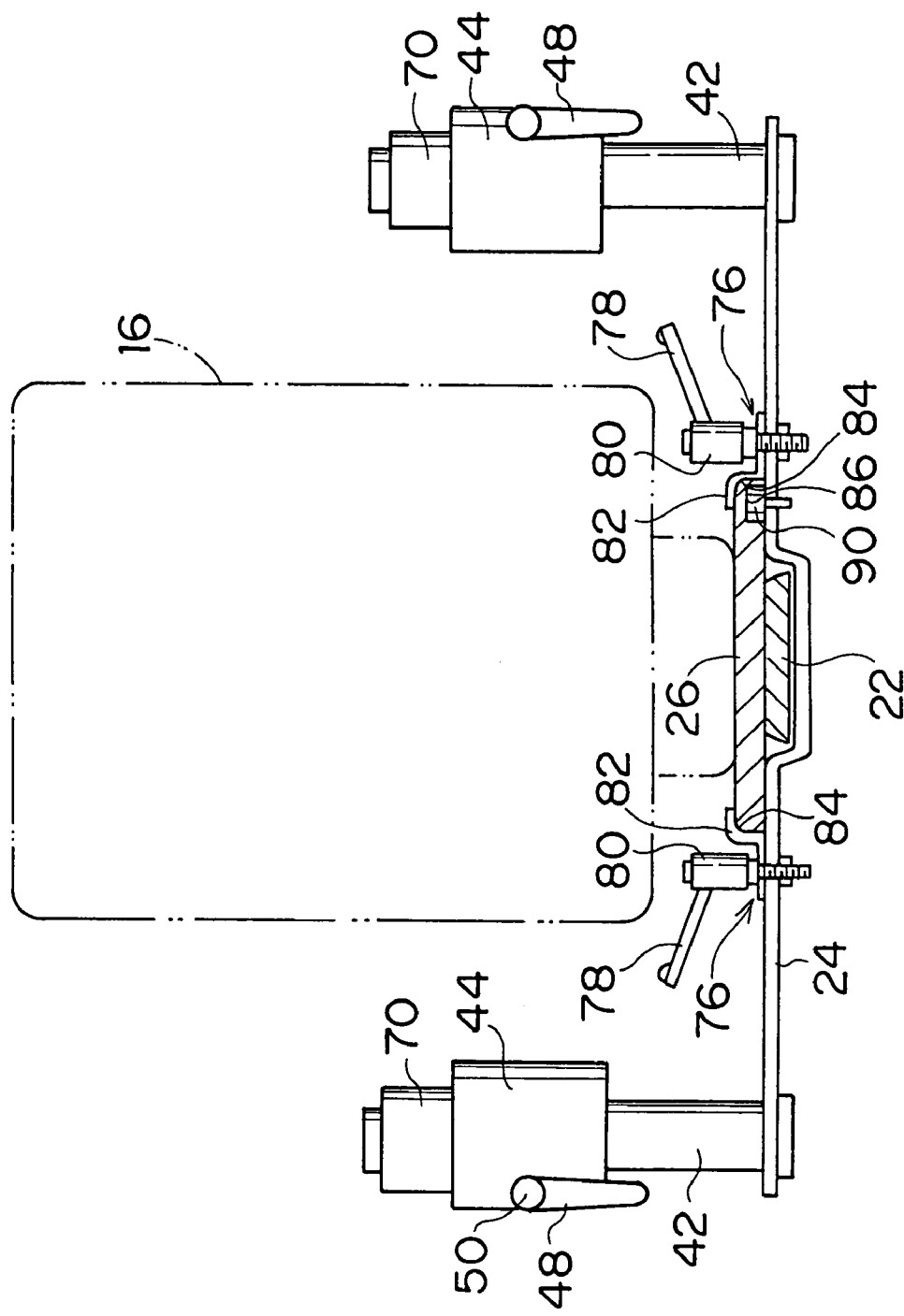
FIG. 8 is a section view of a second support stage along the line 8—8 in FIG. 2.

The first support stage 24 and the second support state 26 which construct the support stage 10 in a manner shown in FIG. 2 are connected by a pair of pressing plates 76 and 76. The pressing plates 76 and 76 are mounted on the first support stage 24 with a screw 80 to which a lever 78 is provided as shown in FIG. 8. A holding piece 82 for fastening and holding the second support stage 26 in between the first support stage 24 is formed at the pressing plates 76, and also a guide face 84 for slidably guiding the second support stage 26 along a longitudinal direction of the second support stage 26 is formed at the pressing plate 76. By this structure, the fastening by the pressing plate 76 and the first support stage 24 is released by loosening the screw 80, so the pressing plate 76 can be slid along the guide face 84 in the longitudinal direction of the second support stage 26.

At the bottom of the second support stage 26, a guide groove 86 shown by a broken line in FIG. 2 is formed along the longitudinal direction of the second support stage 26. The guide groove 86 is engaged with a pair of guide pins 88 and 90 which are projected at the first support stage 24. The guide 88 contacts with a left end 86A in FIG. 2 of the guide groove 86 when the support stage 10 is under the using state in FIGS. 1–3. By this mechanism, sliding of the second support stage 26 with respect to the first support stage 24 in the right direction in FIG. 2 is regulated, and the first support stage 24 and the second support stage 26 are overlapped and held in the overlapped state and at the same time the second support stage 26 with respect to the first support stage 24 is prevented from loosening.

Figure 5:
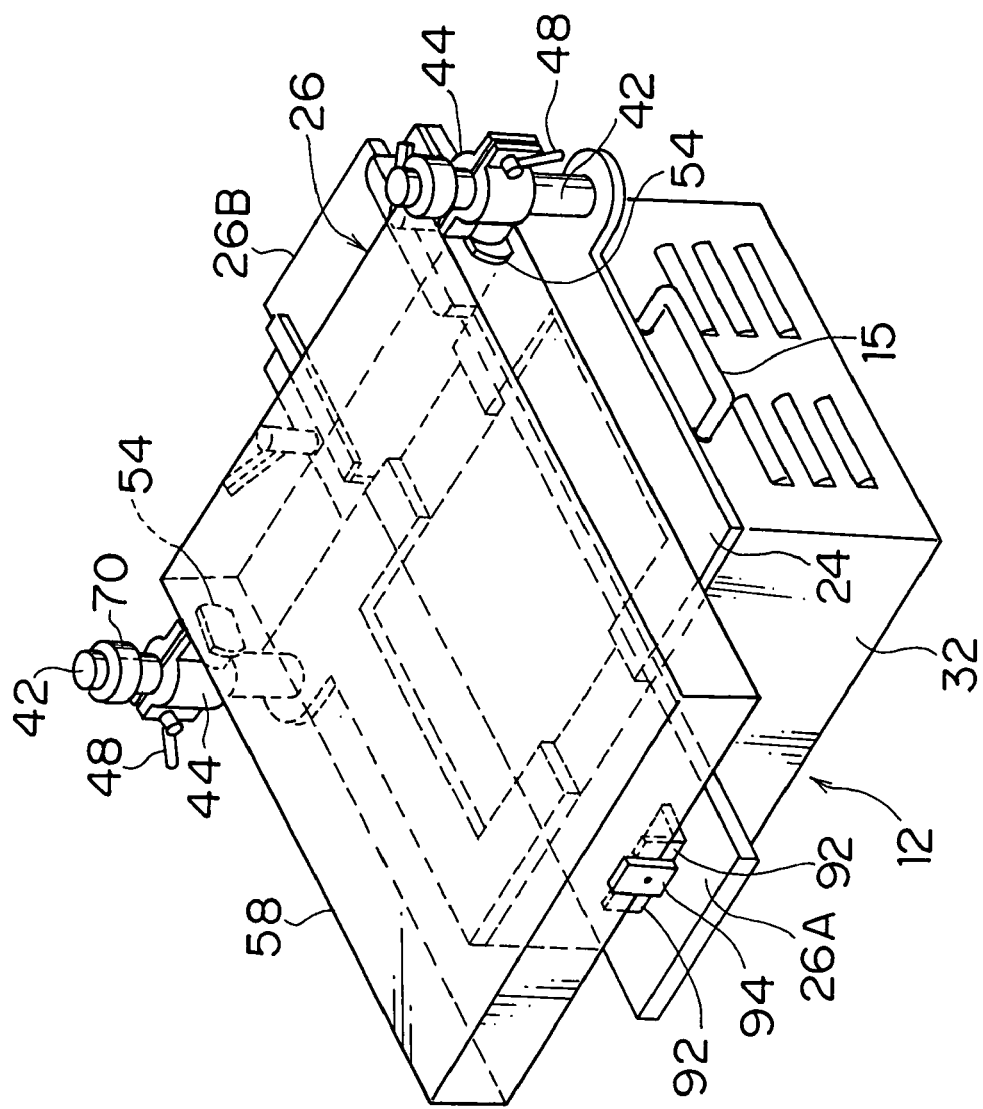
FIG. 5 is a perspective view showing the support stage in a state where a semitransparent mirror is folded.
Figure 6:
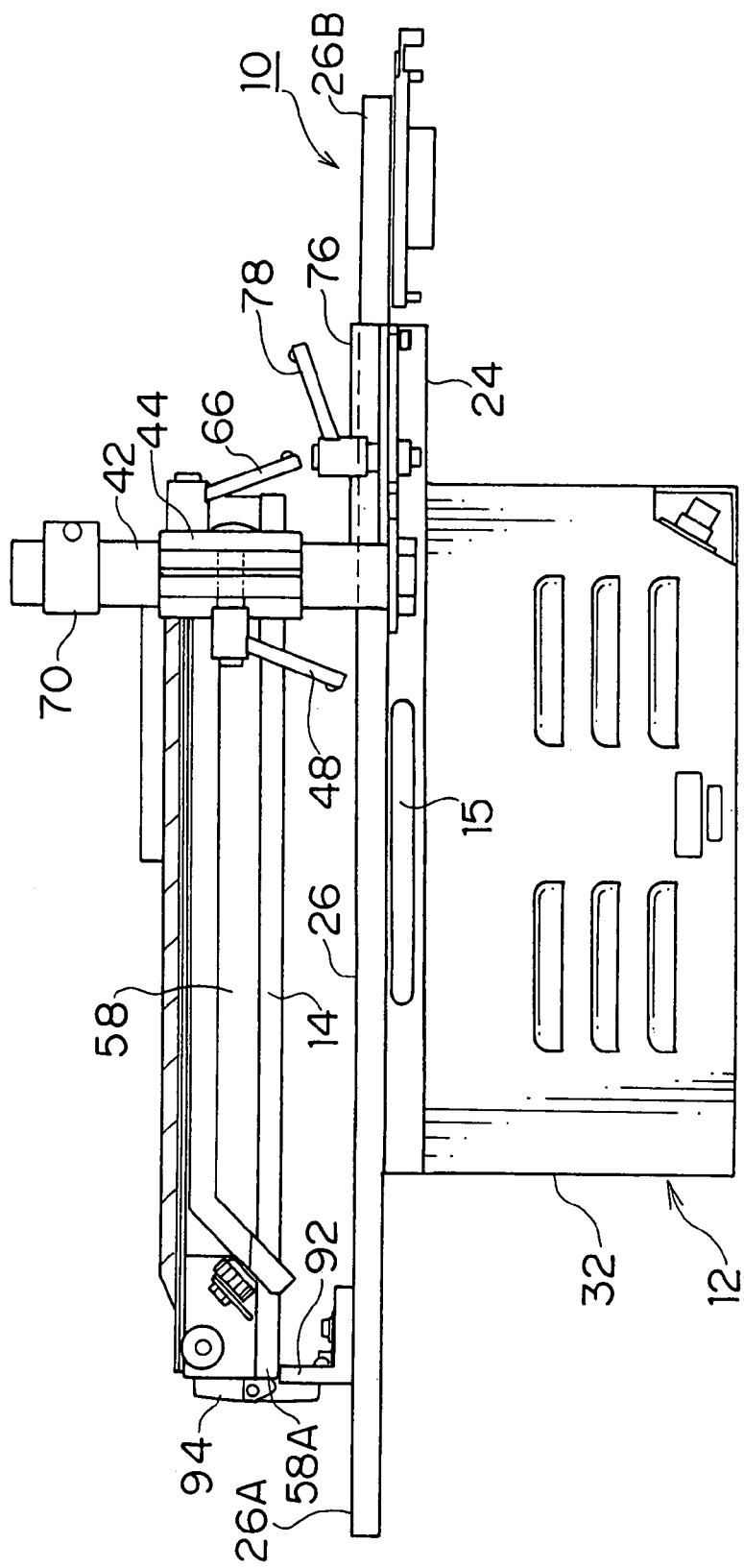
FIG. 6 is a front view of the support stage in FIG. 5.
Figure 7:
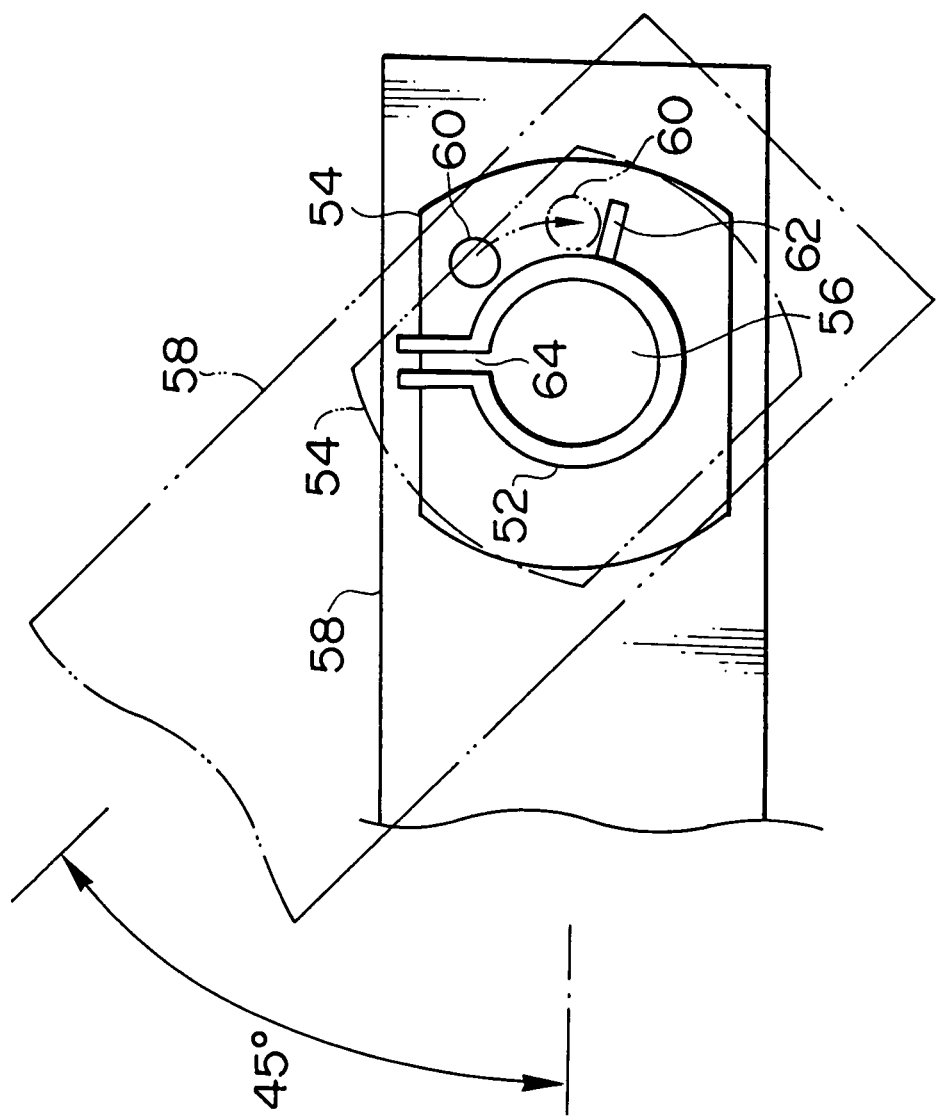
FIG. 7 is an explanatory view of action of an inclination angle adjustment structure for the semitransparent mirror.
Figure 9:
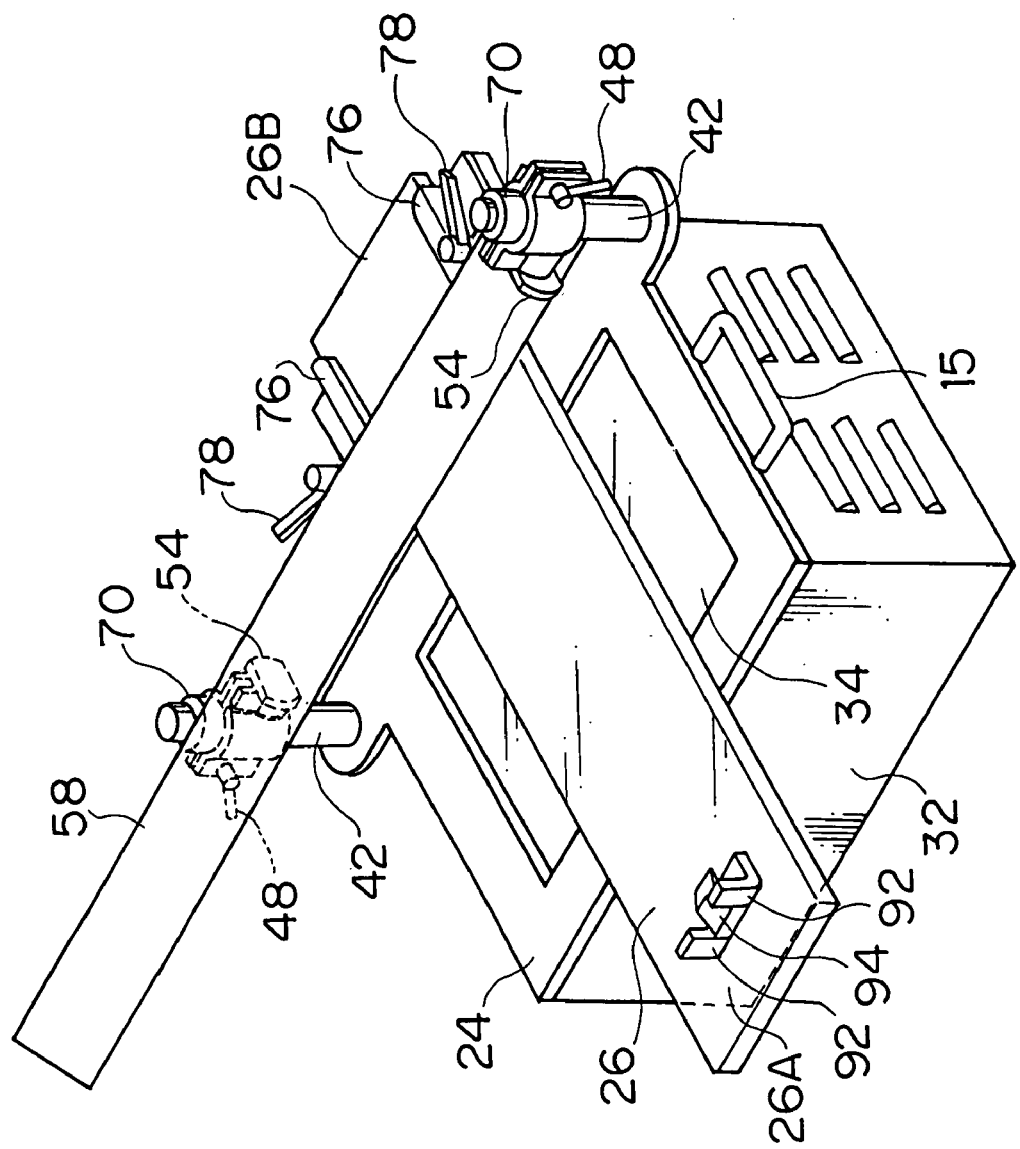
FIG. 9 is a perspective view showing a state where the second support stage is overlapped with the first support stage.

The top end 26A of the second support stage 26 in the overlapping state is at the position where it projects forward of the first support stage 24 in a predetermined amount as shown in FIGS. 5, 6, and 9. As seen from FIG. 6, the projection of both top end 26A and an end 26B of the second support stage 26 with respect to the first support stage 24 is set in the same amount. Thus, the center of gravity of the first support stage 24 and the second support stage 26 are substantially the same in the overlapping state. Also the centers of gravity of the above-mentioned support stages, the LCD, and the semitransparent mirror 14 are substantially the same. Therefore, the support stage 10 can be well-balanced in weight and be carried by grabbing a handle 15 provided at the center of the side face of the first support stage 24.

Directed to the top end 26A of the second support stage 26, mirror supporters 92 and 92 are fixed at the top end 26A, and a top end 58A of the casing 58 of the semitransparent mirror 14 is placed on the mirror supporters 92 and 92. Moreover, at the proximity of the mirror supporters 92 and 92, a lock 94 is provided at the top end 26A, and the lock 94 is engaged with a claw (not shown) provided at the top end 58A of the casing 58 so as to regulate the rotation of the casing 58. The semitransparent mirror 14 is thereby held at the folding position.

In the prompter system in FIG. 1, an optical path of the image of the script which is formed between the LCD device 12 and the semitransparent mirror 14 is enclosed with black masking covers (masking members) 100 and 116 which are shown with alternate long and two short dashes lines in FIG. 1, so that the image of the script reflected by the semitransparent mirror 14 can be clearly shown to the newscaster. Because of the characteristics of the transparent LCD panel 34 in that the displayed image is difficult to see if the external light enters in the LCD panel 34, masking flag 102 which is indicated by the alternate long and two short dashes lines in FIG. 1 is consecutively provided to the masking cover 100 in order to block the external light as much as possible.

Figure 10:
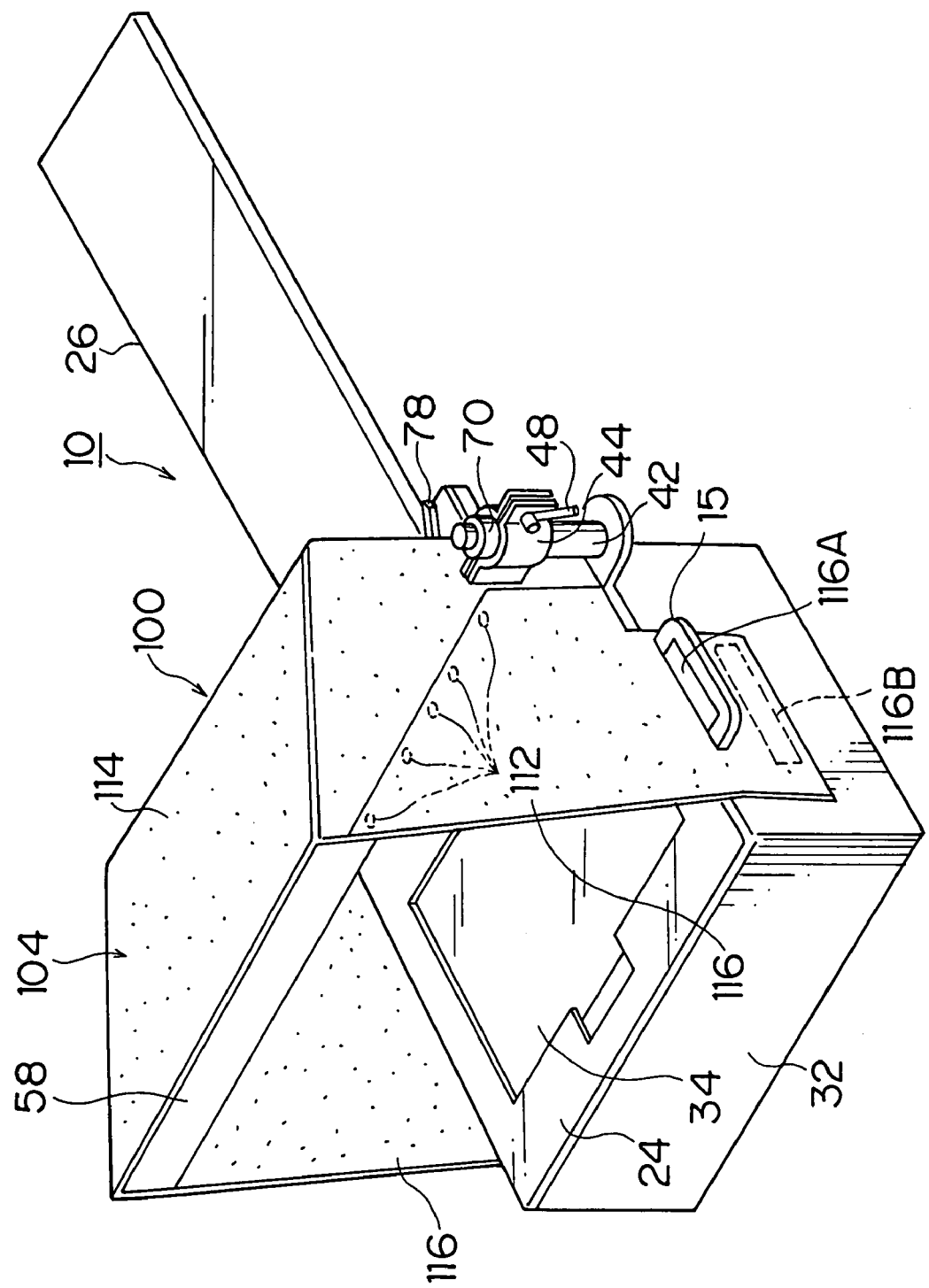
FIG. 10 is an expanded view of a masking cover showing a state where the masking cover is attached to the prompter.
Figure 11:
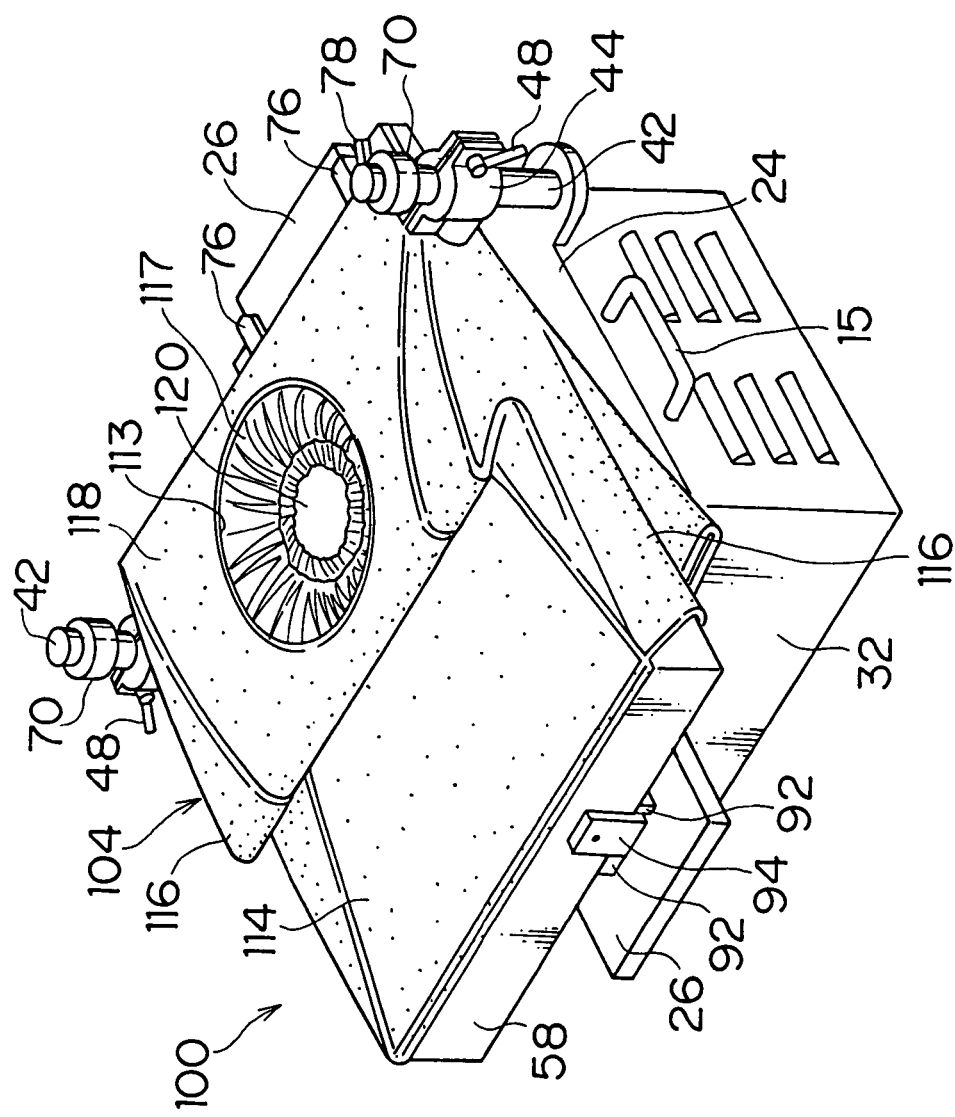
FIG. 11 is a perspective view showing a state where the masking cover in FIG. 10 is folded.

FIG. 10 and FIG. 11 are an expanded view of the masking cover 100 when using the prompter system, and a view showing a state where the semitransparent mirror 14 is folded, respectively.

Figure 12:
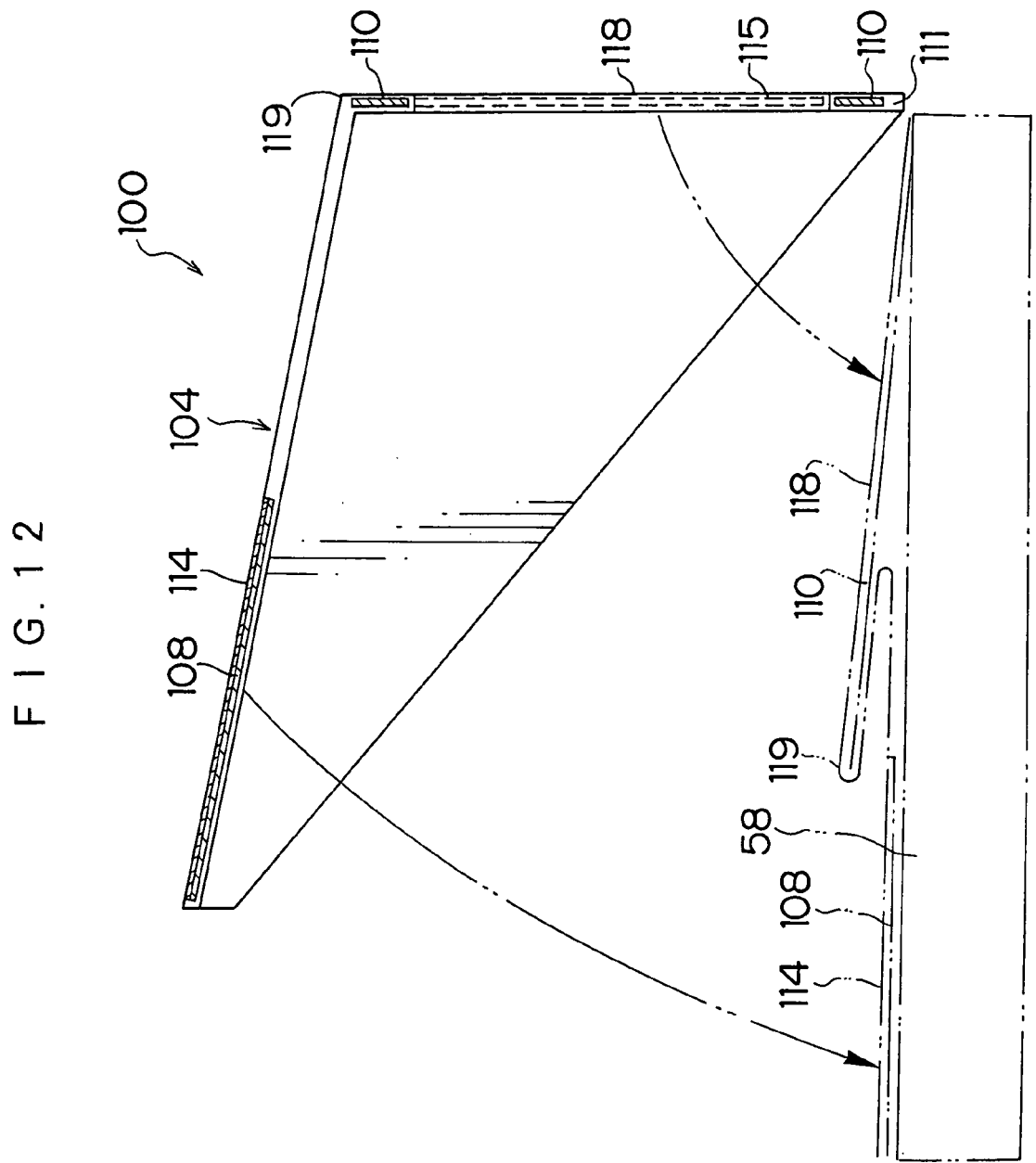
FIG. 12 is a section view of the masking cover in FIG. 10.

The masking cover 100 in FIGS. 10 and 11 comprises a cover body 104 made of flexible nylon, and two reinforcing plates 108 and 110 in FIG. 12 for reinforcing the cover body 104.

As seen from FIGS. 10, 11, and 12, the cover body 104 comprises four faces: a top face 114, side faces 116 and 116, and a rear face 118. The top face 114 and the rear face 118 are integrally formed whereas the side faces 116 and 116 are formed separately. Referring to FIG. 10, a plurality of fixing tools 112, 112, . . . which are fixed at the side face of the casing 58 are provided at the upper oblique line of the side face 116, and an opening 116A for exposing the handle 15 is formed at the bottom of the side face 116 where an adhering member 116B which is detachable from the body 32 of the LCD device 12.

The top face 114 covers the casing 58 of the semitransparent mirror 14 from outside, and at the same time the metal or plastic reinforcing plate 108 is attached to a front half portion of the rear side of the top face 114 over the entire area along the width of the top face 114. On the other hand, the reinforcing plate 110 is attached to the back of the rear face 118.

The masking cover 100 is folded with the reinforcing plates 108 and 110 which are attached at the above-described position, in which a boundary corner 119 between the rear face 118 and the top face 114 is a folding line to fold the plates inwardly, and a bottom periphery 111 of the reinforcing plate 110 is another folding line. The masking cover 100 is folded as shown in FIG. 11 by the above-described manner.

In this folding state, the top face 114 and the rear face 118 to which the reinforcing plate 108 and the reinforcing plate 110 are attached respectively as shown in FIG. 12 are positioned at the top of the casing 58 of the semitransparent mirror 14. As a result, the semitransparent mirror 14 is protected by the two reinforcing plates 108 and 110, and thus the semitransparent mirror 14 can be protected from shock if the masking cover 100 is suddenly bumped against an obstacle while carrying the support stage 10. In the present invention, the reinforcing plates 108 and 110 are made of metal of plastic, so the strength of protection to the semitransparent mirror 14 is improved compared with a paper reinforcing plate.

An ENG lens insertion hole 113 is formed at the rear face 118 as shown in FIG. 11. As seen from FIG. 12, an opening 115 (lens insertion hole) is formed in the reinforcing plate 110 at a portion corresponding with the ENG lens insertion hole 113 so as to allow inserting the ENG lens 30 (refer to FIG. 1). Moreover, masking cloth 117 is attached to the ENG lens insertion hole 113 in FIG. 11. As inserting the top end of the ENG lens 30 through an opening 120 of the masking cloth 117, a peripheral portion of the opening 120 is secured to the peripheral portion of the ENG lens 30 by the restitutive force of a rubber band (not shown) which is attached to the peripheral portion of the opening 120. The external light is thereby prevented from entering from the rear face 118 into the LCD panel 34.

Figure 13:
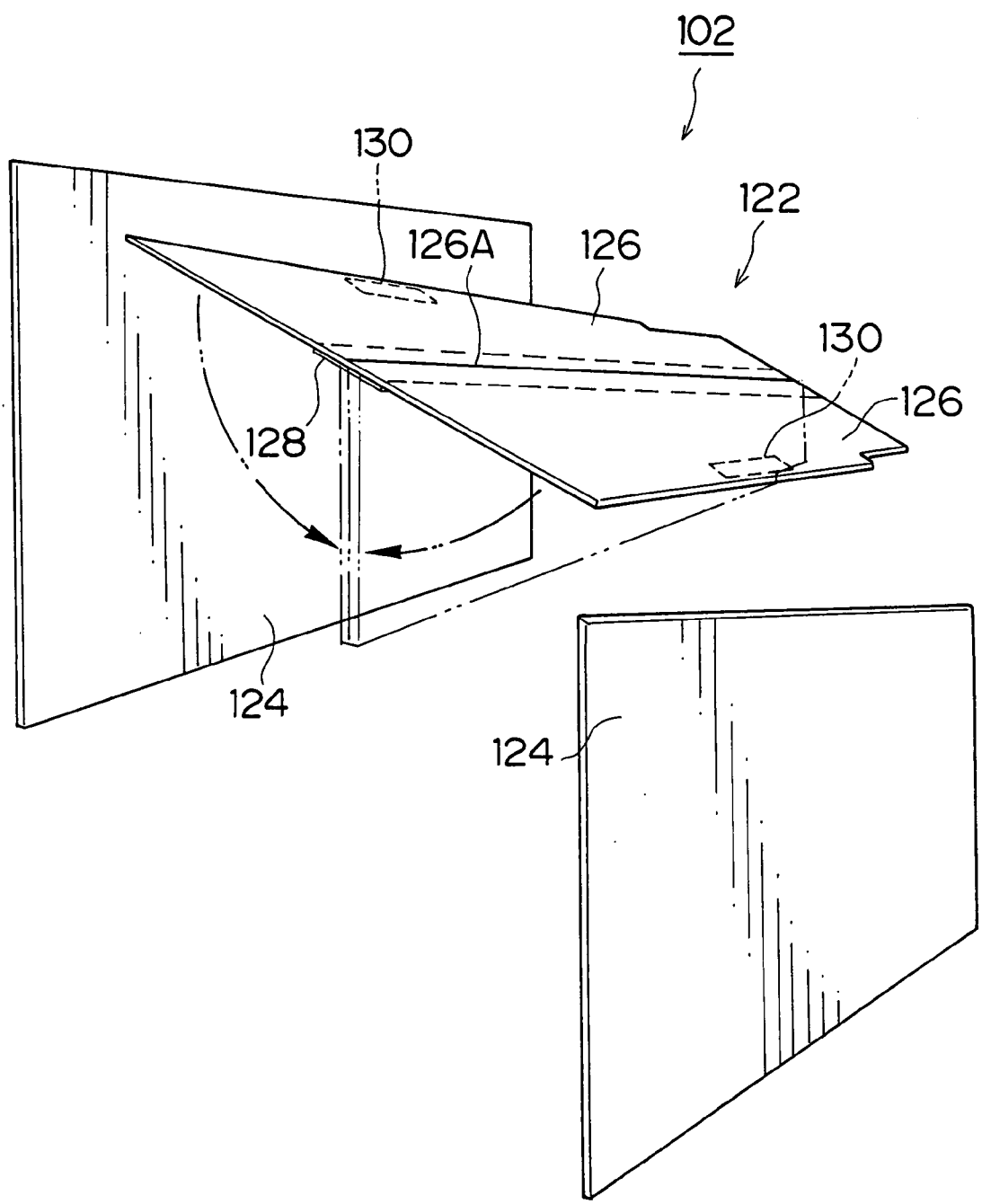
FIG. 13 is a perspective view of an assembly of a masking flag.

FIG. 13 is a view of assembly of the masking flag 102 which comprises a ceiling plate 122, and two side plates 124 and 124. The ceiling plate 122 is attached to the top end 58A of the casing 58 so that the ceiling plate 122 is connected with the top face 114 of the masking cover 100, and the side plates 124 and 124 in FIG. 13 are connected with side faces 116 and 116 of the masking cover 100.

The ceiling plate 122 is divided into two small plates 126 and 126 in order to be easily carried, and the two small plates 126 and 126 are connected by a flexible tape 128 in a state where facing edges 126A and 126A contact at each other. Consequently, the ceiling plate 122 rotates in a direction shown by an arrow in FIG. 13 with the boundary 126A so as to fold the small plates 126 and 126.

By this structure, the ceiling plate 122 is compact in size and at the same time is easy to carry. Moreover, adhering tapes 130 and 130 are attached to the facing faces of the small plates 126 and 126, and the ceiling plate 122 is held in a folded state by adhering the adhering tapes 130 and 130. Thus, the folded small plates 126 and 126 do not open while carrying the ceiling plate 122. In the present embodiment, only the ceiling plate 122 has the bi-divisional structure; however, the side plate 124 may also have the bi-divisional structure so as to further make the masking flag easy to carry. The plates can be divided not only in two divisions, but also in three or more divisions.

In the present embodiment, an example is described in which the masking member is applied to the masking flag 102; however, the masking member may be applied not only to the masking flag 102 but also to the masking cover 100.

Figure 14:
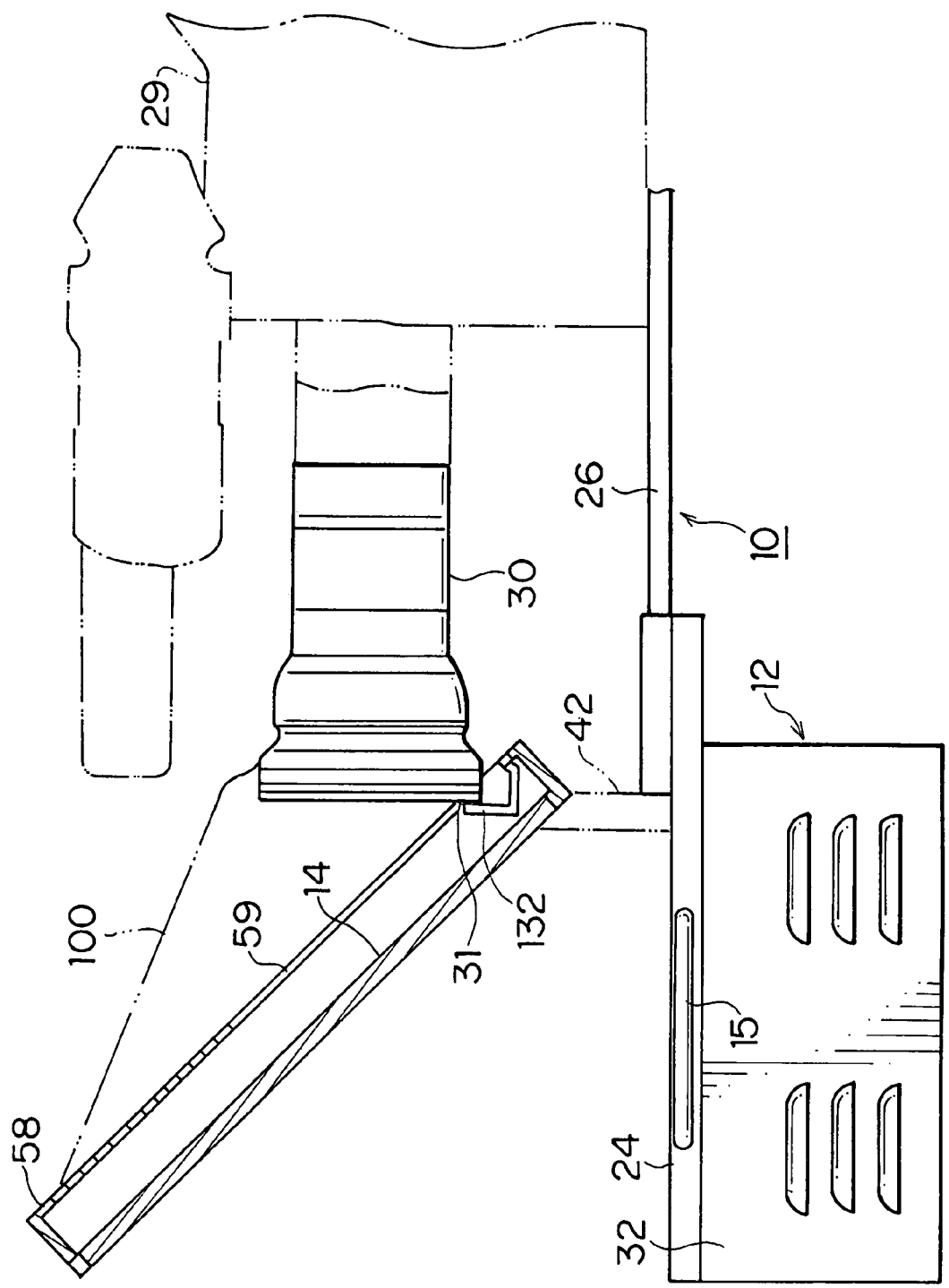
FIG. 14 is a view showing a state where a stopper member for preventing over-insertion of the ENG lens is attached to a casing of the semitransparent mirror.
Figure 15:
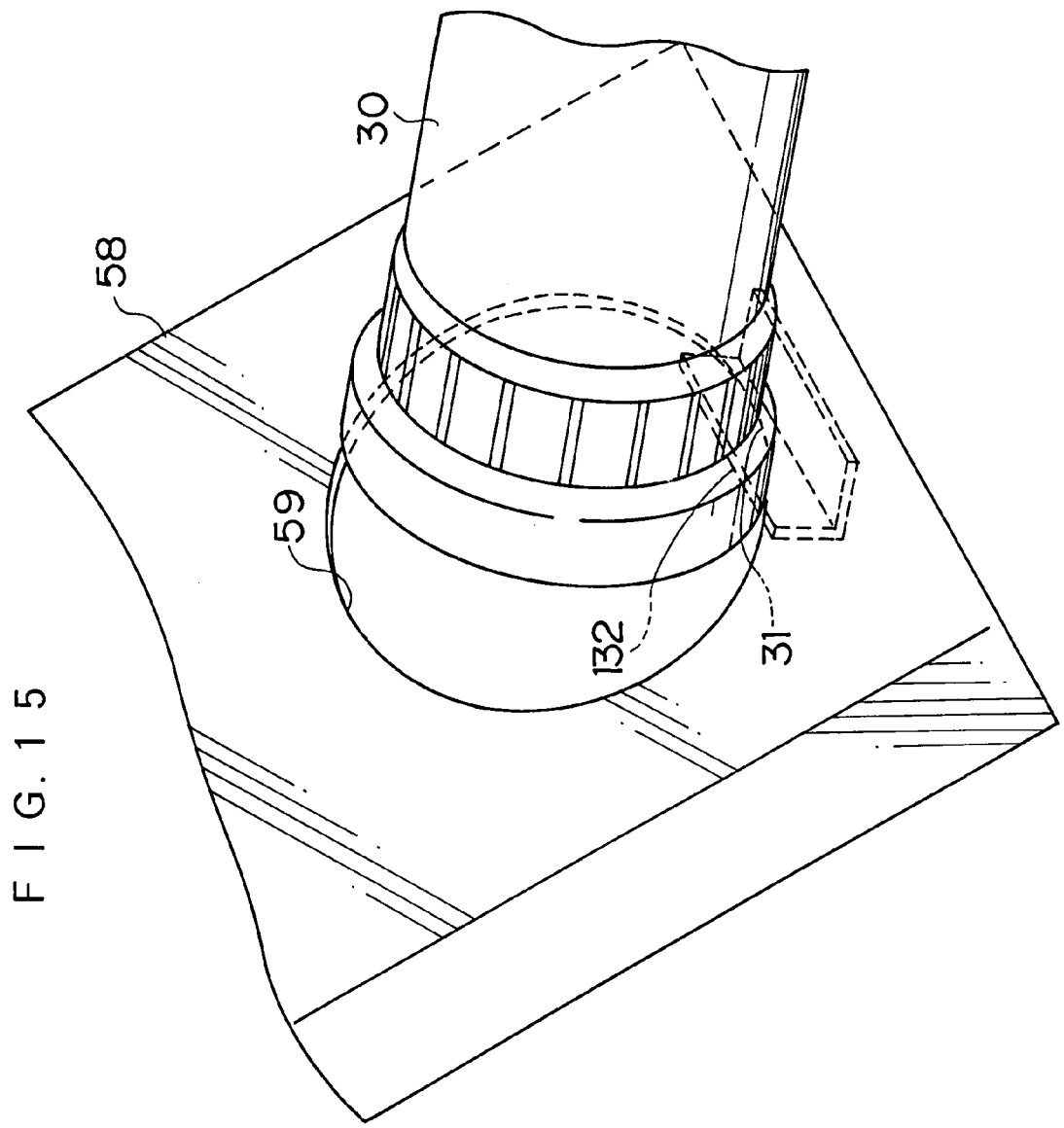
FIG. 15 is a perspective view of the stopper member in FIG. 14.

FIG. 14 is a section view showing a state where an L-shaped stopper member (regulating member) 132 for preventing over-inserting of the ENG lens 30 is attached to the casing 58 of the semitransparent mirror 14. As seen from FIGS. 14 and 15, the stopper member 132 is attached at a position inside the lens insertion hole 59 which is formed substantially at the center of the casing 58 and also outside an imaging range of the ENG lens 30.

The stopper member 132 is provided at a position just in front of the semitransparent mirror 14 and also the position corresponding with the inserting position regulated by the ENG lens 30. When inserting the ENG lens 30 through the lens insertion hole 59 of the casing 58, the top end 31 of the ENG lens 30 always contacts with the stopper member 132 just before contacting with the semitransparent mirror 14, and inserting later on is regulated. Consequently, the ENG lens 30 does not collide with the semitransparent mirror 14 so the semitransparent mirror 14 can be protected from the ENG lens. In addition, the stopper member 132 may be attached to inside of the opening 115 of the reinforcing plate 110 in FIG. 12.

When attaching the ENG lens 30 with respect to the semitransparent mirror 14, the ENG lens 30 is inserted through the lens insertion hole 115 of the reinforcing plate 110 into the lens insertion hole 59 of the casing 58 via the opening 120 of the masking cloth 117 which is provided at the back face of the masking cover 100. In short, the ENG lens 30 is inserted through the insertion holes 115 and 59 in a state where it is blinded by the masking cloth 117. Even though the ENG lens is inserted through the insertion holes 115 and 59 in such blind state, the ENG lens 30 is automatically positioned at the position where the top end 31 contacts with the stopper member 132 (the regulated position of the ENG lens 30); hence the positioning operation of the ENG lens 30 is easy.

Preferred material for a shock absorber to be adhered to the contact face of the stopper member 132 with which the lens top end 31 contacts, is rubber or sponge which is flexible and can absorb shock. The ENG lens 30 and the stopper member 132 themselves can be protected from shock (caused when contacting the ENG lens 30 with the stopper member 132) by the shock absorber.

In order to improve the protection by the stopper member 132 and the strength of the stopper member 132, the stopper member 132 is preferred to be as large as possible. However, if the stopper member 132 is large, the stopper member 132 enters into the imaging range of the ENG lens 30 and the stopper member 132 is photographed. This problem can be solved by making the stopper member 132 with a transparent member. In other words, because the stopper member 132 is transparent, it is not photographed even though it is made larger and enters into the imaging range of the ENG lens 30.

Next, a description will be given of how to carry the support stage 10 which is constructed as described above.

First, the support stage 10 is detached from the camera platform 20 after the ENG camera 16 is detached from the second support stage 26 of the support stage 10 in FIG. 1.

Next, the screws 80 and 80 are loosened by turning the levers 78 and 78 in FIG. 8 so as to release fastening of the second support stage 26 by the pressing plates 76 and 76 and the first support stage 24, and the second support stage 26 is moved toward the first support stage 24 so as to overlap the second support stage 26 with the first support stage 24 as shown in FIG. 9. Then the levers 78 and 78 are turned in the fastening direction so as to fix the second support stage 26 by fastening the second support stage 26 with the pressing plates 76 and 76 and the first support stage 24.

After that, the levers 48 and 66 at the semitransparent mirror 14 side are turned so as to loosen the screws 50 and 68 in FIG. 4, and the casing 58 of the semitransparent mirror 14 is lowered and inclined, then the top end 58A of the casing 58 is placed on the mirror supporters 92 and 92. The top end 58A of the casing 58 is locked by the lock 94 at this point. Thereby, the support stage 10 changes its state from the using state in FIG. 1 to the carrying state in FIG. 5, and the support stage 10 is carried by grabbing the handle 15.

As described above, the support stage 10 of the present embodiment is constructed in the bi-divisional structure comprising the first support stage 24 on which the LCD device 12 and the semitransparent mirror 14 are supported and the second support stage 26 on which the ENG camera 16 is supported. Moreover, the first support stage 24 and the second support stage 26 can be overlapped by the slide mechanism; thus the support stage 10 is compact in size and at the same time the weight balance of the support stage 10 is good when carrying, which also means easy to carry.

Moreover, the present embodiment uses the slide mechanism as the overlapping mechanism, so the first support stage 24 and the second support stage 26 can be easily overlapped.

The first support stage 24 and the second support stage 26 are slid and overlapped in the present embodiment; however, overlapping is not limited to the one mentioned above. The first support stage 24 and the second support stage 26 may be connected via a hinge, and the first support stage 24 and the second support stage 26 are relatively rotated so as to overlap them.

The present embodiment describes the bi-divisional structure comprising the first support stage 24 and the second support stage 26; however a third support stage may be provided so as to construct a tri-divisional structure.

The description will now be given of an operation of the semitransparent mirror support structure which is constructed as described above.

In a case where the semitransparent mirror 14 is positioned from the housing position in FIG. 5 to the using position in FIG. 1, lock of the case 58 by the lock 94 is unlocked.

Next, the screw bar 50 in FIG. 4 is turned by the lever 48 in a direction to loosen the fastening of the screw bar 50, and the width of the channel 46 of the sleeve 44 is widened, then the fixing of the sleeve 44 to the pole 42 is released. Thereby the semitransparent mirror 14 can be moved vertically along the pole 42, and the semitransparent mirror 14 is moved up to the using position.

As moving up the semitransparent mirror 14, the top of the sleeve 44 contacts with the bottom of the stopper ring 70, and thus the height of the semitransparent mirror 14 is automatically set. After that, the screw bar 50 is turned by the lever 48 in a direction to fasten the screw bar 50 and the sleeve 44 is fixed at the pole 42. By the above-described operation, the semitransparent mirror 14 is fixed at an appropriate height. At this point, the inclination angle of the semitransparent mirror 14 is zero degrees.

In a case where the inclination angle of the semitransparent mirror 14 is at 45 degrees, the screw bar 68 in FIG. 4 is turned by the lever 66 in a direction to loosen the screw bar 68, and the width of the channel 64 of the sleeve 52 is widened, then the fixing of the sleeve 52 to the rod 56 is released. Thereby the semitransparent mirror 14 can be rotated with the rod 56 as the center; after that the semitransparent mirror 14 is rotated by the inclination angle of 45 degrees, which is the using position of the semitransparent mirror 14.

When rotating the semitransparent mirror 14 at the inclination angle 45 degrees, the stopper pin 60 provided to the bracket 54 in FIG. 4 contacts with the stopper plate 62, whereby the semitransparent mirror 14 is automatically set at the using position by the inclination angle of 45 degrees. The screw bar 68 is then turned by the lever 66 in a direction to fasten the screw bar 68 so as to fix the sleeve 52 at the rod 56. By the above-described operation, the semitransparent mirror 14 is fixed at the using position in FIG. 1.

In addition, if positioning the semitransparent mirror 14 from the using position to the housing position, an operation described above can simply be reversed.

As presented above, in the semitransparent mirror support structure in the present embodiment, the stopper ring 70 for regulating the vertical position of the semitransparent mirror 14 is provided at the pole 42 which supports the semitransparent mirror 14 to be vertically movable. Thus, the difficulty with the position adjustment of the semitransparent mirror 14 in the vertical direction can be eliminated.

The present embodiment uses the stopper ring 70 as the stopper member; however, the stopper member is not limited to the stopper ring. The stopper member may be any kind of material if the height of the sleeve 44 can be set with respect to the pole 42. For example, a number of screw holes may be provided at the side face of the pole 42 along the direction of its axis, and a bolt is screwed into a screw hole which corresponds with the height of the semitransparent mirror 14, then the sleeve 44 is contacted with the bolt so as to regulate the height of the semitransparent mirror 14.

As has been described above, the prompter support member of the present invention is divided into the first support member and the second support member and the first support member and the second support member are constructed to be overlapped by the slide mechanism or the overlapping mechanism so as to make the support member portable and compact in size. The support mechanism can thus be easy to carry.

In the semitransparent mirror support structure for the prompter of the present invention, the regulating member for regulating the position of the semitransparent mirror in its moving direction is provided to the support member for supporting the semitransparent mirror to be movable in its moving direction with respect to the display. Thus the position of the semitransparent mirror in its moving direction is automatically set by only moving the semitransparent mirror from the housing position to the using position; thereby the present invention can also eliminate the difficulty with position adjustment of the semitransparent mirror.

Moreover, the masking member for the prompter of the present invention is constructed so that it can be folded in the manner that the back face is overlapped with the top face of the masking member. When overlapped, the respective reinforcing plates attached to the top face and the back face are positioned at the upper position of the top face of the semitransparent mirror; thus the semitransparent mirror can be sufficiently protected from shock.

Further, the masking member for the prompter of the present invention is constructed to have a divisional structure comprising at least two members. The divided members are connected with each other with the flexible tape members, and the members are folded to be carried; therefore, the masking member is easy to carry.

Furthermore, in the prompter of the present invention, the regulating member for regulating the position to insert the TV camera is provided at the rear position inside the lens insertion hole of the casing; therefore the semitransparent mirror can be protected from the TV camera.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A prompter support member which supports a prompter system at a camera platform, the prompter system comprising:

a display which displays an image;

a semitransparent mirror which reflects the image displayed on the display in a predetermined direction; and a TV camera arranged at a rear of an image reflecting face of the semitransparent mirror, wherein the prompter support member has a multi-divisional structure comprising a plurality of support members, including a first support member, and a second support member, the display and the semitransparent mirror being supported by the first support member, the display being provided under the first support member and the semitransparent mirror being provided above the first support member, wherein the TV camera is supported by the second support member, the second support member being detachably connected to a TV camera platform, and wherein the first support member, second support member, display and mirror can be positioned such that they overlap each other where the second support member is slideable to overlap with a top face of the first support member, and the mirror is foldable onto the second support member.

2. The prompter support member as defined in claim 1, further comprising a slide mechanism in which the plurality of support members are slidably connected, and the plurality of support members are moved by the slide mechanism in a direction that the plurality of support members are closer to each other so as to overlap the support members.

\* \* \* \* \*